(No Model.)
E. W. DRAKE.
LEVER FOR SULKY PLOWS.
No. 387,777. Patented Aug. 14, 1888.
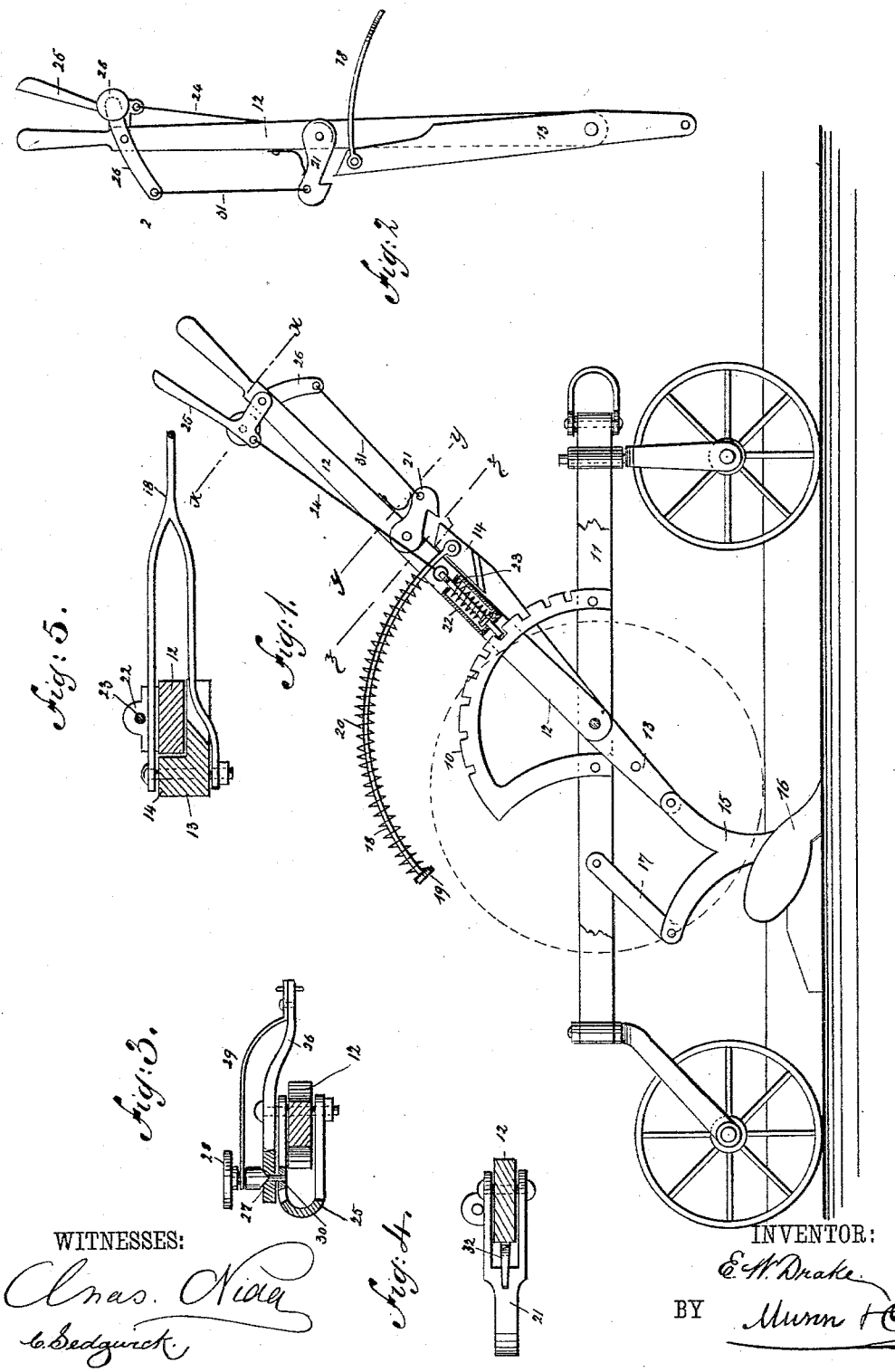
WITNESSES:
Chas. Nida
C. Sedgwick
INVENTOR:
E. W. Drake
BY Munn & Co.
ATTORNEYS.

UNITED STATES PATENT OFFICE.

EARL W. DRAKE, OF POYNETTE, WISCONSIN.

LEVER FOR SULKY-PLOWS.

SPECIFICATION forming part of Letters Patent No. 387,777, dated August 14, 1888.

Application filed May 22, 1888. Serial No. 274,731. (No model.)

*To all whom it may concern:*

Be it known that I, EARL W. DRAKE, of Poynette, in the county of Columbia and State of Wisconsin, have invented a new and useful Improvement in Levers for Sulky-Plows, of which the following is a full, clear, and exact description.

My invention relates to an improvement in levers for sulky-plows, and has for its object to provide an effective and simple means whereby a sulky-plow will do as good or better work in stony ground than can be accomplished with the ordinary walking-plow.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of a sulky-plow having my improvement applied. Fig. 2 is a side elevation of the lever detached. Fig. 3 is a transverse section on line *x x* of Fig. 1. Fig. 4 is a similar section on line *y y* of Fig. 1, and Fig. 5 is a like section on the line *z z* of Fig. 1.

In carrying out the invention a segmental rack, 10, is attached in any approved manner to the frame 11 of the plow. Upon the said frame 11 an ordinary lifting-lever, 12, is fulcrumed, and upon one side of the lever 12 an auxiliary lever, 13, is pivoted, which auxiliary lever is provided at its upper end with an integral lug or projection, 14, upon one face, which projection is adapted to engage the under side of the main lever, as best shown in Fig. 1.

At or near the lower extremity of the auxiliary lever 13 the shank 15 of the plow 16 is pivoted, or the plow beam or arm on which plow is hung, which shank 15 or other support of the plow is likewise preferably connected with the frame 11 through the medium of a link, 17. I do not, however, restrict myself to the exact connection of the plow-shank with the frame, as illustrated in the drawings, nor as to the connection of auxiliary lever 13 with plow, as it may be through the medium of a beam, the frame, or arm on which the plow or beam is hung, as aforesaid.

The two levers 12 and 13 extend upward at one side of the rack 10, and the auxiliary lever 13 is provided with a yoke-like bar, 18, spanning the same at the upper end and attached in any approved manner. The yoke 18 also embraces the main lever 12, and is preferably curved upward and outward therefrom, as best illustrated in Fig. 1. The said yoke 18 is ordinarily provided upon its extremity with a button, 19, purposed to support one end of a coil or spiral spring, 20, which spring surrounding the yoke has a bearing at its opposite end upon the upper edge of the main lever 12. The latch 21 is pivoted to the main lever 12 above the auxiliary lever 13, the said latch being so located that it will extend downward from the main lever immediately opposite the upper extremity of the auxiliary lever.

Upon one face of the main lever 12, adjacent to the rack 10, a box or casing, 22, is formed, in which a spring-actuated bolt, 23, is held to reciprocate, the said bolt being adapted to engage the said rack 10. The upper end of the bolt 23 is connected by a wire, rope, or chain, 24, or equivalent means, with an elbow-lever, 25, fulcrumed upon the main lever 12 at or near the upper end. A second short lever, 26, is also pivoted to the upper end of the main lever 12, preferably by the same bolt or pin pivoting the elbow-lever, the straight lever 26 being adapted to normally extend transversely the face of the main lever 12, and is provided at its upper end with an angular recess or indentation, 27, as best shown in Fig. 3.

A button, 28, having a lower face adapted to the contour of the aforesaid recess 27, is normally held in said recess through the medium of a spring, 29, attached to the button at one end and secured to the lower end of the short lever 26 at its outer extremity. The button 28 is also provided with a pin, 30, projecting centrally from the under face, which pin is adapted to pass through an aperture in the short lever 26 into a second aperture produced in one face of the elbow-lever, as best shown in Fig. 3. The spring 29 is so connected with the button 28 that the latter may freely turn in the frame. The lower extremity of the short transverse lever 26 is connected with the latch 21 by a rope or chain, 31, or equivalent means, as best shown in Figs. 1 and 2. The rope or chain 31 is adapted to normally hold the catch 21 disengaged from the upper extremity of the auxiliary lever 13, and the said catch 21 is provided with a spring, 32, (best shown in Fig. 4,) which spring, when the tension upon the cord 31 is removed, automatically throws the catch in engagement with the said upper extremity of the auxiliary lever.

In operation the plow 16 may be buried in the ground or elevated therefrom any desired distance by simply withdrawing the bolt 23 from engagement with the rack 10 and carrying the main lever 12 either upward or downward, as occasion may demand. The plow having been set to the proper depth, as the sulky is driven forward, should the plowshare come in contact with a stone or similar obstruction, the latch 21 being out of engagement with the auxiliary lever, the plow is permitted to rise from the ground with a rearward motion which compresses the spring 20 surrounding the yoke 18. Immediately upon the release of the plowshare from the obstruction the spring 20, expanding automatically, draws the lug 14 upon the auxiliary lever in engagement with the main lever, thereby restoring the plowshare to its proper position.

Should the ground be very hard, the plowshare may be prevented from having a vertical movement by engaging the latch 21 with the upper end of the auxiliary lever. This is effected in the following manner: The pin 30 of the button 28 is so secured in the elbow-lever 25 that the catch 21 will be held out of engagement with the auxiliary lever. Thus by giving said button 28 a quarter-turn the said button rises out of its seat in the lever 26, withdrawing the pin 30 from the retaining-aperture in the elbow-lever at the same time. The short lever 26 being thus released, the tension upon the cord or chain 31 is removed and the spring of the latch 21, acting, forces said latch in engagement with the upper end or extremity of the auxiliary lever, effectually binding the main and auxiliary levers together. When the parts are in this position, it is evident that the plowshare will be held rigidly or in a fixed position. The catch 21 being out of engagement with the auxiliary lever, to elevate the plow it simply becomes necessary to bear down upon the upper end of the main lever, at the same time pressing upon the elbow-lever to disengage the locking-bolt from the rack 10. The main lever 12 as it is carried downward, bearing against the lug 14 upon the auxiliary lever, causes the lower extremity of the latter to be elevated, carrying the plowshare with it. When the plowshare is elevated, and it is desired to carry the same downward in contact with the ground, the extremity of the main lever 12 and the elbow-lever 25 are grasped by the hand, whereupon the locking-bolt 23 will be withdrawn from the rack 10 and the lower end of the short lever 26 will be carried downward, whereby the tension is removed from the rope or chain 31, permitting the catch 21 to engage with the upper extremity of the auxiliary lever. The auxiliary and main levers being thus bound together, may be carried upward by the manipulation of the main lever. When the main lever has been sufficiently elevated or the plowshare sufficiently depressed, the elbow-lever 25 is released and drawn to its normal position by the spring encircling the locking-bolt, the said spring also forcing the locking-bolt in engagement with the lock. Upon the release of the elbow-lever the latch 21 is automatically carried to its normal position—that is, out of engagement with the auxiliary lever. This is accomplished by reason of the spring encircling the locking-bolt being stronger than the spring controlling the latch.

Having thus fully described my invention, I claim as new and desire to secure by Letters Patent—

1. In a sulky-plow, the combination, with the main or lifting lever, of a spring-actuated auxiliary lever pivoted to the main lever and adapted to carry the plow, substantially as and for the purpose specified.

2. In a sulky-plow, the combination, with the main or lifting lever, of a spring-actuated auxiliary lever pivoted to the main lever, and a plow connected with the auxiliary lever at or near the lower extremity, as and for the purpose specified.

3. In a sulky-plow, the combination, with the main or lifting lever, of a spring-actuated auxiliary lever pivoted to the main lever, a plow connected to the lower extremity of the said auxiliary lever, and a means, substantially as shown and described, for manipulating the auxiliary lever independent of the main lever, as and for the purpose specified.

4. In a sulky-plow, the combination, with the main or lifting lever and an auxiliary lever pivoted to the same, of a plow connected with the lower extremity of the said auxiliary lever, and means, substantially as shown and described, for jointly manipulating the main and auxiliary levers, as and for the purpose specified.

5. In a sulky-plow, the combination, with the main or lifting lever, an auxiliary lever pivoted to the main lever, and a plow connected with the lower extremity of the said auxiliary lever, of a yoke attached to the upper extremity of the auxiliary lever, extending over and beyond the main lever, a spring secured upon said yoke bearing upon the main lever, and means, substantially as shown and described, for locking the said main lever in a predetermined position, as and for the purpose specified.

6. In a sulky-plow, the combination, with the main or lifting lever, an auxiliary lever pivoted to the main lever, provided with a lug at the upper extremity engaging the main lever, and a plow connected with the lower extremity of the said auxiliary lever, of a yoke secured to the said lug extending over and beyond the main lever, a spring held upon said yoke and bearing upon the main lever, a spring-actuated latch pivoted upon the said main lever in advance of the yoke, and means, substantially as shown and described, for manipulating said latch, as and for the purpose specified.

7. In a sulky-plow, the combination, with a main lever, an auxiliary lever carrying the plow, provided with a lug engaging the main lever, and a rack, of the latch 21, engaging the auxiliary lever, the latch 23, engaging the rack, the elbow-lever 25, pivoted on the main lever and connected with the latch 23, the lever 26, pivoted on the same point with the lever 25 and connected with the latch 21, and the adjustable button 28, substantially as shown and described.

EARL W. DRAKE.

Witnesses:
E. SHAUGHNESSY,
G. TOWNSEND.